United States Patent
Fu et al.

(10) Patent No.: US 10,361,626 B2
(45) Date of Patent: Jul. 23, 2019

(54) MULTI-LEVEL POWER FACTOR CORRECTION CIRCUIT USING HYBRID DEVICES

(71) Applicant: Futurewei Technologies, Inc.

(72) Inventors: Dianbo Fu, Frisco, TX (US); Xiaolin Mao, Plano, TX (US); Heping Dai, Plano, TX (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 16/007,325

(22) Filed: Jun. 13, 2018

(65) Prior Publication Data

US 2019/0020271 A1    Jan. 17, 2019

Related U.S. Application Data

(60) Provisional application No. 62/532,782, filed on Jul. 14, 2017.

(51) Int. Cl.
*H02M 7/219* (2006.01)
*H02M 1/42* (2007.01)
(Continued)

(52) U.S. Cl.
CPC ....... *H02M 1/4266* (2013.01); *H02M 1/4208* (2013.01); *H02M 7/483* (2013.01);
(Continued)

(58) Field of Classification Search
CPC ............ H02M 7/02; H02M 7/04; H02M 7/12; H02M 7/21; H02M 7/217; H02M 7/219;
(Continued)

(56) References Cited

U.S. PATENT DOCUMENTS 10,084,391 B2 * 9/2018 Xu .......................... H02M 7/48
2005/0237771 A1 10/2005 Franck et al.
(Continued)

FOREIGN PATENT DOCUMENTS

| CN | 101588124 A | 11/2009 |
|----|-------------|---------|
| CN | 101728961   | 6/2010  |

(Continued)

OTHER PUBLICATIONS

Zhang, J., et al., "Single inductor three-level bridgeless boost power factor correction rectifier with nature voltage clamp," IET Power Electronics, Mar. 2011, 8 pages.

(Continued)

*Primary Examiner* — Gary L Laxton
(74) *Attorney, Agent, or Firm* — Vierra Magen Marcus LLP

(57) ABSTRACT

AC to DC converters, more specifically Power Factor Correction (PFC) circuits, using a multi-level waveform and hybrid devices are presented. From an AC voltage input a multi-level waveform is generated, which is used to generate high and low DC output voltage levels. The multi-level waveform is connected to the DC outputs through a corresponding intermediate node by an initial switch, and from the intermediate node to the corresponding output by a hybrid device. The hybrid device includes a first current path, such as a series connected switch-diode pair, in parallel with second current path of a relatively faster and lower current device, such as a diode. The resultant arrangement can use devices having lower voltage ratings relative to typical PFC circuit designs.

20 Claims, 8 Drawing Sheets

(51) Int. Cl.
*H02M 7/483* (2007.01)
*H02M 7/487* (2007.01)
*H02M 7/06* (2006.01)
*H02M 1/00* (2006.01)

(52) U.S. Cl.
CPC .............. *H02M 7/487* (2013.01); *H02M 7/06* (2013.01); *H02M 2001/0048* (2013.01)

(58) Field of Classification Search
CPC .... H02M 1/42; H02M 1/4208; H02M 1/4233; H02M 1/42266
See application file for complete search history.

(56) References Cited

U.S. PATENT DOCUMENTS

2015/0200602 A1* 7/2015 Narimani ............ H02M 5/4585
363/37
2017/0250533 A1* 8/2017 de Jesus Cardoso Filho ..............
H02M 1/12

FOREIGN PATENT DOCUMENTS

EP        1589645 A2    10/2005
WO     2013086445 A1     6/2013

OTHER PUBLICATIONS

International Search Report dated Oct. 18, 2018 in PCT Application No. PCT/CN2018/095718, 10 pages.

* cited by examiner

MULTI-LEVEL POWER FACTOR CORRECTION CIRCUIT USING HYBRID DEVICES

PRIORITY CLAIM

This application claims the benefit of U.S. Provisional Pat. App. No. 62/532,782, filed Jul. 14, 2017, which is incorporated herein by reference.

FIELD

The following is related generally to the field of alternating current (AC) to direct current (DC) converters and, more specifically, to power factor correction circuits and techniques.

BACKGROUND

A power factor correction circuit is a form of AC to DC converter. FIG. 1 illustrates an example of an AC to DC converter 2 implemented by a power factor correction system 20 that includes a power factor correction (PFC) circuit 21 and a control unit 23. The power factor correction (PFC) circuit 21 is connected to one or more AC sources 10 to generate one or more DC outputs, here Vout+ and Vout−. PFC circuits are often used for high voltage applications, such as a power distribution network or a charging system for an electrical vehicle. The power factor of an AC electrical power system is defined as the ratio of the real power (the capacity of the circuit for performing work) supplied to a load to the apparent power (the product of the current and voltage of the circuit) in the circuit. Due to energy stored in the load and returned to the source, or due to a non-linear load that distorts the wave shape of the current drawn from the source, the apparent power will be greater than the real power. Power factor correction (PFC) is the use of power electronics to change the waveform of current drawn by a load to improve the power factor of such AC to DC converters and are used across a wide range of applications.

The control unit 23 can be a closed-loop control unit that accepts at its inputs the received AC current $i_{ac}$, the received AC voltage $V_{ac}$, and DC bus voltage levels (Vout+ and Vout−) that are the system's output. The control unit 23 generates a set of switching control signals used by the power factor correction circuit 21 to improve the power factor by aligning phases of the received current $i_{ac}$ and received voltage $V_{ac}$.

FIG. 2 shows an example of a PFC circuit 121, which can be used as the PFC circuit 21 in FIG. 1. In the PFC circuit 121 of FIG. 2, an AC source 101 is connected through input inductor 103 to an input node N. The input node N is connected to the top and bottom lines supplying Vout+ and Vout− (which can also be referred to as first and second output nodes) through respective diodes 111 and 113. The DC output of the PFC circuit 121 is taken between these nodes. The input node N is also connected through a switch Q 115 to an intermediate node M of a voltage divider formed of the capacitors 127 and 129 connected in series between the Vout+ node and the Vout− node. (In this discussion, Vout + and Vout− are used to refer both to these nodes and their respect voltages levels.) In a typical arrangement, the capacitors 127 and 129 will have the same capacitance so that the voltage level on the intermediate node M will be midway between the Vout+ and Vout− levels. During the positive half cycle of $V_{ac}$ and when the switch Q 115 is off, the voltage on the input node N is passed by diode 111 to the Vout+ node. During the negative half cycle of $V_{ac}$ and when the switch Q 115 is off, the voltage on input node N is passed by diode 113 to the Vout− node. In either half cycle, when switch Q 115 is on, the input node N is set to the intermediate voltage level (e.g., ground, or some voltage offset from ground). The control circuitry (23, FIG. 1) of the system generates the control signal Vcontrol for the switch Q 115 to modulate the waveform on the input node N to perform the power factor correction.

As PFC circuits are often used with high voltage levels, the diodes 111 and 113 need to be able to support the high voltage levels involved. For example, a typical implementation of the PFC circuit 121 for FIG. 2 may require the diodes to take a full bus voltage of 1200V. Although 1200V SiC diodes are available, they tend to have high cost, high conduction losses, and low efficiency. Consequently, it would be useful to have a PFC circuit capable of handling such high voltage levels, but without the high cost, high conduction losses, and low efficiency associated with use of such diode elements.

SUMMARY

According to one aspect of the present disclosure, an alternating current (AC) to direct current (DC) converter including a first switch, a second switch, a first circuit element, a second circuit element, a first hybrid device, and a second hybrid device. An input node is configured to accept an AC signal. The first switch is connected between the input node and a first intermediate node. The second switch is connected between the input node a second intermediate node. The first circuit element is configured to provide a current path from a mid-level node to the first intermediate node. The second circuit element is configured to provide a current path from the second intermediate node to the mid-level node. The first hybrid device is configured to provide first and second current paths in parallel from the first intermediate node to a first output node, wherein the first current path is a faster switching, lower current rated path than the second current path. The second hybrid device configured to provide third and fourth current paths in parallel from a second output node to the second intermediate node, wherein the third current path is a faster switching, lower current rated path than the fourth current path. The first switch, second switch, first hybrid device, and second hybrid device are collectively configured to generate a multi-level waveform at the input node in response to a set of control signals. The AC to DC converter is configured to provide a DC output between the first output node and the second output node.

Optionally, in the preceding aspect, another implementation of the aspect provides that the first circuit element includes a first diode connected along a current path from the mid-level node to the first intermediate node, and the second circuit element includes a second diode connected along a current path from the second intermediate node to the mid-level node.

Optionally, in any of the preceding aspects, a further implementation of the aspect provides that the first circuit element includes a third switch connected between the mid-level node and the first intermediate node, and the second circuit element includes a fourth switch connected between the second intermediate node and the mid-level node.

Optionally, in the preceding aspect, another implementation of the aspect provides that the first circuit element further includes a first diode connected in parallel with the third switch between the mid-level node and the first intermediate node, and the second circuit element further includes a second diode connected in parallel with the fourth switch between the second intermediate node and the mid-level node.

Optionally, in any of the preceding aspects, a further implementation of the aspect provides that the AC to DC converter includes voltage divider that comprises: a first capacitor connected between the first output node and the mid-level node; and a second capacitor connected between the second output node and the mid-level node.

Optionally, in any of the preceding aspects, a further implementation of the aspect provides that the first hybrid device comprises: first and second diodes connected along parallel current paths from the first intermediate node to the first output node, wherein the first diode is a faster switching, lower current rated device than the second diode; and a third switch connected in series with the second diode between the first intermediate node and the first output nod. Additionally, the second hybrid device comprises: third and fourth diodes connected along parallel current paths from the second intermediate node to the second output node, wherein the third diode is a faster switching, lower current rated device than the fourth diode; and a fourth switch connected in series with the fourth diode between the second intermediate node and the second output node.

Optionally, in the preceding aspect, a further implementation of the aspect provides that the AC to DC converter further includes control circuitry connected to the first, second, third and fourth switches, wherein the control circuitry is configured such that in a first half cycle, the first switch is on, the fourth switch is off, and the second and third switches are turned on according to non-overlapping waveforms, and in a second half cycle, the second switch is on, the third switch is off, and the first and fourth switches are turned on according to non-overlapping waveforms.

Optionally, in the preceding aspect, a further implementation of the aspect provides that the control circuitry is connected to receive an AC waveform and generate therefrom a control voltage waveform, wherein the first half cycle corresponds to a positive voltage half cycle of the control voltage waveform and the second half cycle corresponds to a negative voltage half cycle of the control voltage waveform.

Optionally, in the preceding two aspects, a further implementation of the aspect provides the first circuit element includes a fifth switch connected between the mid-level node and the first intermediate node, and the second circuit element includes a sixth switch connected between the second intermediate node and the mid-level node. The control circuitry is further connected to the fifth and sixth switches and is further configured such that in the first half cycle the fifth switch is off and the sixth switch is on, and such that in the second half cycle the sixth switch is off and the fifth switch is on.

According to a further aspect of the present disclosure, an alternating current (AC) to direct current (DC) conversion system includes an input node configured to accept an AC signal, a power factor correction circuit, and a control circuit. The power factor correction circuit includes: a first switch connected between the input node and a first intermediate node; a second switch connected between the input node and a second intermediate node; a first circuit element configured to allow current to flow from a mid-level node to the second intermediate node; and a second circuit element configured to allow current to flow from the second intermediate node to the mid-level node. The power factor correction circuit also includes: a first hybrid device, comprising first and second current paths in parallel from the first intermediate node to a first output node, wherein the first current path is a faster switching, lower current rated path than the second current path; and a second hybrid device, comprising third and fourth current paths in parallel from a second output node to the second intermediate node, wherein the third current path is a faster switching, lower current rated path than the fourth current path. A DC output is between the first output node and the second output node. The control circuit is connected to the input node and to the first and second output nodes, the control circuit configured to generate switching signals for the first and second switches and for the first and second hybrid devices based upon a voltage and a current at the input node and voltage levels on the first and second output nodes.

Optionally, in the preceding aspect, another implementation of the aspect provides that the first hybrid device comprises: first and second diodes connected along parallel current paths from the first intermediate node to the first output node, wherein the first diode is a faster switching, lower current rated device than the second diode; and a third switch connected in series with the second diode between the first intermediate node and the first output node. The second hybrid device comprises: third and fourth diodes connected along parallel current paths from the second intermediate node to the second output node, wherein the third diode is a faster switching, lower current rated device than the fourth diode; and a fourth switch connected in series with the fourth diode between the second intermediate node and the second output node.

Optionally, in the preceding aspect, another implementation of the aspect provides that the control circuitry is connected to the first, second, third and fourth switches. The control circuitry is configured such that in a first half cycle, the first switch is on, the fourth switch is off, and the second and third switches are turned on according to non-overlapping waveforms, and in a second half cycle, the second switch is on, the third switch is off, and the first and fourth switches are turned on according to non-overlapping waveforms.

According to another aspect of the present disclosure, there are provided methods to receive an alternating current input voltage at an input node of an AC to DC converter and respectively generate first and second output voltages at first and second output nodes of the AC to DC converter from the alternating current input voltage. The AC to DC converter includes: a first hybrid device, comprising first and second current paths in parallel from a first intermediate node to a first output node, wherein the first current path is a faster switching, lower current rated path than the second current path; and a second hybrid device, comprising third and fourth current paths in parallel from a second output node to a second intermediate node, wherein the third current path is a faster switching, lower current rated path than the fourth current path. Generating the first and second output voltages includes: when in a first half cycle, setting the second intermediate node to a voltage level between the first output voltage and the second output voltage and applying a pulse width modulated waveform at the first intermediate node; and when in a second half cycle, setting the first intermediate node to the voltage level between the first output voltage and the second output voltage and applying a pulse width modulated waveform at the second intermediate node.

Optionally, in the preceding aspect, a further implementation of the aspect provides that the method provides that the first hybrid device comprises: first and second diodes connected along parallel current paths from the first intermediate node to the first output node, wherein the first diode is a faster switching, lower current rated device than the second diode; and a third switch connected in series with the second diode between the first intermediate node and the first output node. The second hybrid device comprises: third and fourth diodes connected along parallel current paths from the second intermediate node to the second output node, wherein the third diode is a faster switching, lower current rated device than the fourth diode; and a fourth switch connected in series with the fourth diode between the second intermediate node and the second output node. Generating the first output voltage comprises selectively turning on the third switch. Generating the second output voltage comprises selectively turning on the fourth switch.

Optionally, in any of the preceding aspects, a further implementation of the aspect provides that in the method the AC to DC converter further comprises: a first switch connected between the input node and the first intermediate node; a second switch connected between the input node and the second intermediate node; a first circuit element configured to allow current to flow from a mid-level node to the first intermediate node, where the mid-level node has the voltage level between the first output voltage and the second output voltage; and a second circuit element configured to allow current to flow from the second intermediate node to the mid-level node. The method includes: in the first half cycle: setting the first switch on, the fourth switch off, and turning the second and third switches on according to non-overlapping waveforms; and in the second half cycle: setting the second switch on, the third switch off, and turning the first and fourth switches on according to non-overlapping waveforms.

Optionally, in the preceding aspect, a further implementation of the aspect provides that the method further includes generating a control voltage waveform from the alternating current input voltage, wherein the first half cycle corresponds to a positive voltage half cycle of the control voltage waveform and the second half cycle corresponds to a negative voltage half cycle of the control voltage waveform.

Optionally, in the preceding aspect, a further implementation of the aspect provides that the method provides that the control voltage waveform is further generated based on the first and second output voltages.

Optionally, in any of the preceding aspects, a further implementation of the aspect provides that in the method the first circuit element is a fifth diode connected along a current path from the mid-level node to the first intermediate node, and the second circuit element is a sixth diode connected along a current path from the second intermediate node to the mid-level node.

Optionally, in any of the preceding aspects, a further implementation of the aspect provides that in the method the first circuit element includes a fifth switch connected between the mid-level node and the first intermediate node, and the second circuit element includes a sixth switch connected between the second intermediate node and the mid-level node and that generating the first and second output voltage further includes: in the first half cycle turning off the fifth switch and turning on the sixth switch is on, and in the second half cycle turning off the sixth switch and turning on the fifth switch.

Optionally, in any of the preceding aspects, a further implementation of the aspect provides that in the method the first circuit element further includes a fifth diode connected in parallel with the fifth switch between the mid-level node and the first intermediate node, and the second circuit element further includes a sixth diode connected in parallel with the sixth switch between the second intermediate node and the mid-level node.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

The following technology presents some examples of multi-level power correction circuits using hybrid devices that can be implemented using circuit elements having lower voltage and current ratings. The described power factor correction (PFC) circuits, or, more generally, AC to DC converters, are multi-state (more specifically, three-state in the examples discussed herein) in that, rather than having a two-level voltage (either high or low) on an input node, they use a three-state waveform having an intermediate level in addition to the high and low (or positive and negative) levels. The PFC circuits use elements that are hybrid in that they use two parallel paths to supply the output nodes by having a hybrid device of a diode path in parallel with a switched path. The first current path is a faster switching, lower current rated path than the second path.

FIGS. 3A-3E show a first embodiment of a multi-level hybrid PFC circuit 221 and corresponding control waveforms, such as could be employed in, for example, a power distribution network or a charging system for an electrical vehicle. These applications are by way of example only, and it is understood that the AC to DC converters of the present technology may be used in other applications.

Figure 3A:
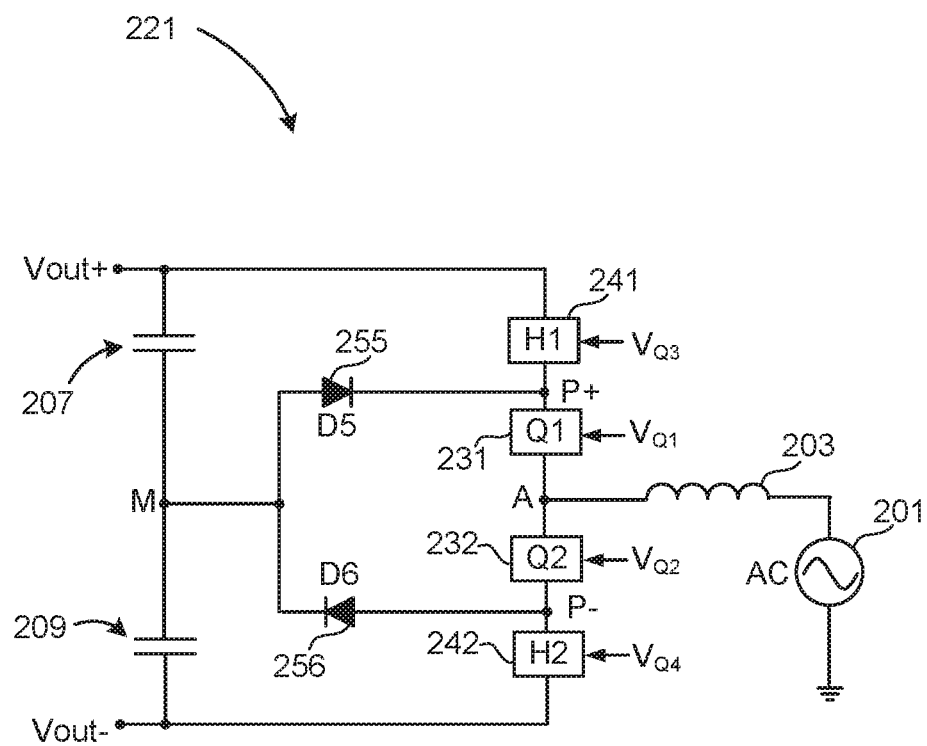
FIG. 3A is a first example of a multi-level power factor correction circuit according to an embodiment of the present technology.

In FIG. 3A, an AC voltage source 201 is shown to the right of the PFC circuit 221 and is connected to an input node A through an input inductance 203. In the illustrated embodiment, only a single AC source and single PFC circuit 221 are shown, but, more generally, multiple AC sources with offset phases could be further split into multiple branches, each of a similar PFC circuit. For example, a tri-phase input split by coupled inductors into three branches could be used, so that the input node A of FIG. 3A would be one of nine branches. To simplify the discussion, the examples herein will show only a single branch.

A voltage divider the includes capacitors 207 and 209 is connected between the high output node Vout+ and the low output node Vout− of the PFC circuit 221 of FIG. 3A to provide an intermediate voltage level at a mid-level node M of the voltage divider. An embodiment of the voltage divider is the capacitors 207 and 209 that are respectively connected to the high output node Vout+ and the low output node Vout−, with the mid-level node M in between. The capacitors 207 and 209 can be capacitors formed to have essentially the same capacitance value, for example. The intermediate voltage level of the mid-level node M is generally controlled to be near half way between respective voltages at the Vout+ node and the Vout− node. The input node A is connected to an upper intermediate node P+ through a switch Q1 231, with the node P+ in turn connected to the Vout+ node by a hybrid device H1 241. The upper intermediate node P+ is also connected to the mid-level node M through the diode D5 255, oriented to allow current to flow from the mid-level node M to the upper intermediate node P+. The switch Q1 232 can be implemented, e.g., using a transistor.

The Vout− node is similarly connected to the input node A, with the input node A connected through a switch Q2 232 through a lower intermediate node P−, which is in turn connected to the Vout− node through a hybrid device 242. The lower intermediate node P− is connected to the mid-level node M through a diode D6 256, oriented to allow current to flow towards the mid-level node M. Depending on the embodiment, the mid-level node M may connect to a neutral point (e.g., ground) of the input. Consequently, the intermediate voltage level on this mid-level node M can be a DC bus middle node level that may correspond to ground or the AC neutral point of a grid from which an input from the AC voltage source 201 is received. The switch Q2 232 can be implemented, e.g., using a transistor.

Figure 3B:
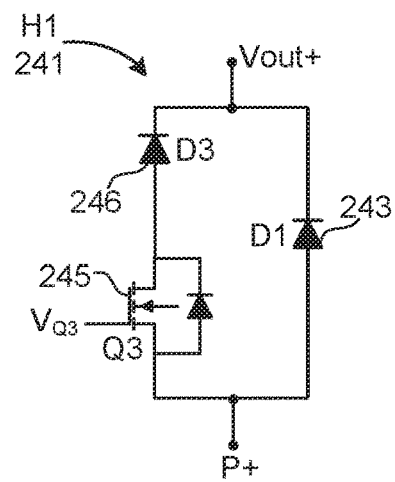
FIG. 3B shows one embodiment for one of the hybrid devices of FIG. 3A.

FIG. 3B illustrates an embodiment of the hybrid device H1 in FIG. 3A. The hybrid device H1 241 combines a diode D1 243 in parallel with a series combination of a switch Q3 245 and a diode D3 246, with the diodes begin oriented to allow current to flow from the upper intermediate node P+ to the Vout+ node. In the embodiment shown, the switch Q3 245 is implemented as a transistor.

Figure 3C:
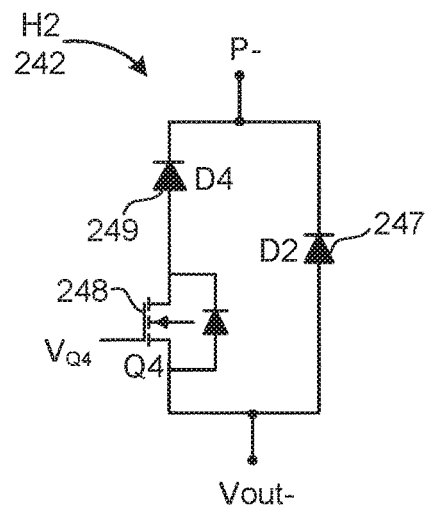
FIG. 3C shows one embodiment for another one of the hybrid devices of FIG. 3A.

FIG. 3C illustrates an embodiment of the hybrid device H2 in FIG. 3A. Hybrid device H2 242 is similarly formed of a diode D2 247 in parallel with a series connected switch-diode pair of switch Q4 248 and D4 249, where the diodes D2 247 and D4 249 are oriented as shown, to allow current to flow from Vout− towards the lower intermediate node P−. In the embodiment shown, the switch Q4 248 is implemented as a transistor.

Operation of the hybrid devices H1 241 and H2 242 is discussed further below, following the discussion of FIG. 3E.

Figure 3D:
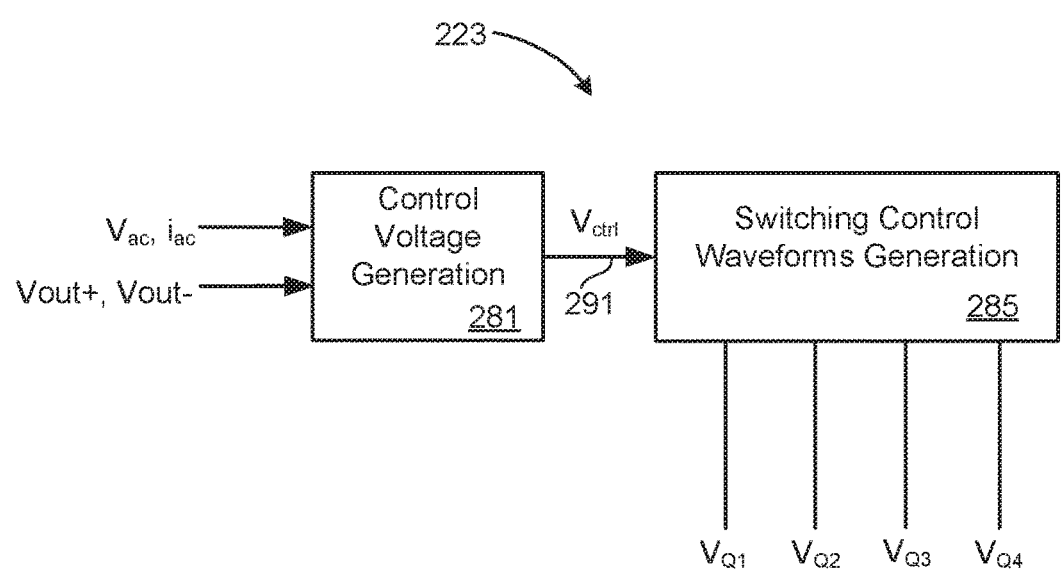
FIG. 3D illustrates control elements for use with the circuit of FIG. 3A.

FIG. 3D is a block diagram for an embodiment of a control unit 223 for a power factor correction system based on the PFC circuit 221 of FIGS. 3A-3C. The control unit 223 is shown as including a control voltage generator block 281 (which can also be referred to as a control voltage generator 281) and a switching control waveforms generation block 285 (which can also be referred to as a switching control waveforms generator 285). A control signal $V_{ctrl}$ 291 is generated by the control voltage generation block 281, which is used by the switching control waveform generating block 285 to determine pulse-width modulation (PWM) waveforms $V_{Q1}$, $V_{Q2}$, $V_{Q3}$, and $V_{Q4}$ for respectively controlling the switches Q1 231, Q2 232, Q3, 245, and Q4 248 of FIGS. 3A-3C.

Figure 3E:
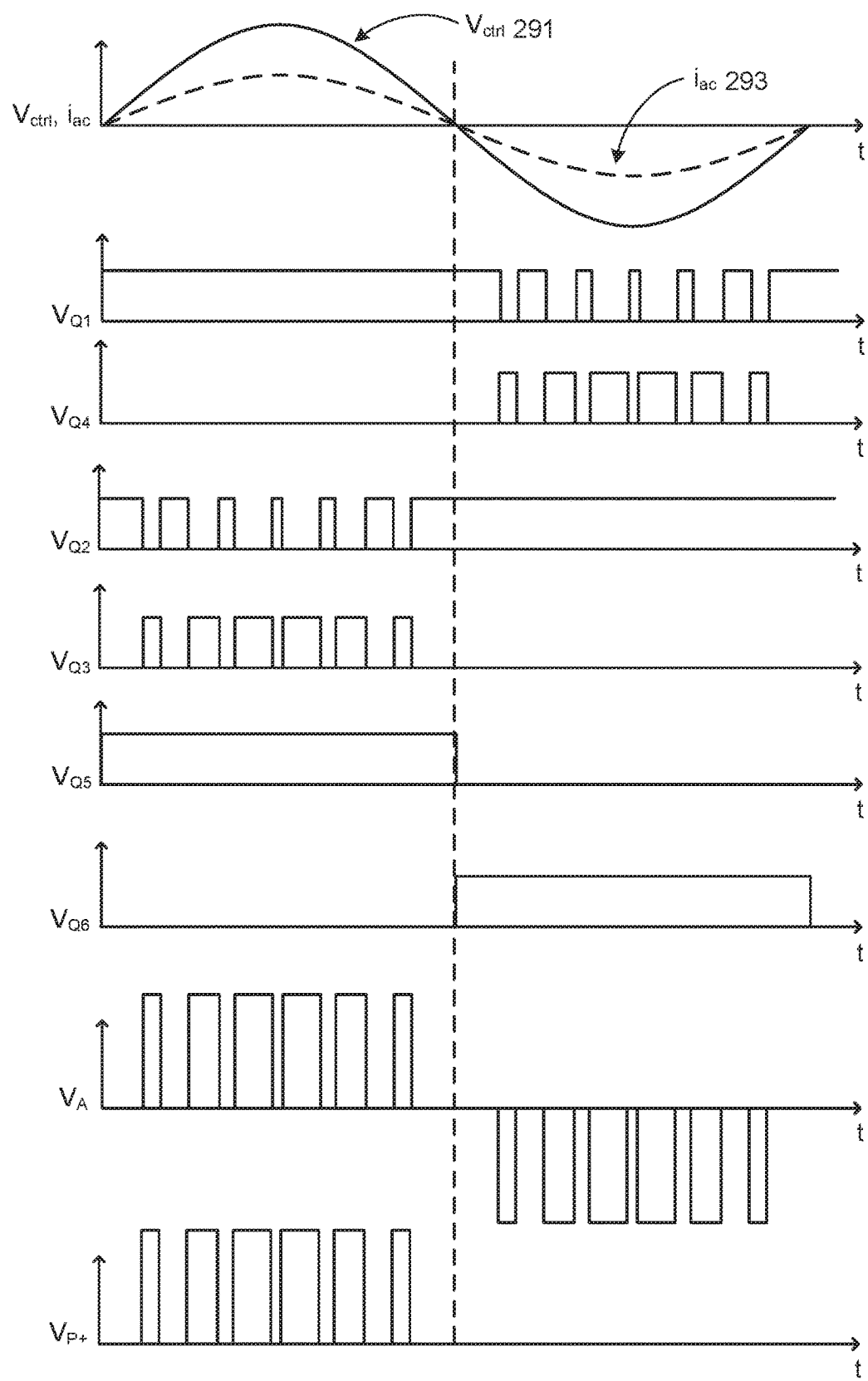
FIG. 3E illustrates a set of waveforms for use with the circuits of FIGS. 3A, 4 and 5.

In one set of embodiments, switches Q1 231, Q2 232, Q3, 245, and Q4 248 are implemented as MOSFETs and waveforms $V_{Q1}$, $V_{Q2}$, $V_{Q3}$, and $V_{Q4}$ (examples of which are shown in FIG. 3E) respectively correspond to control gate voltages applied to these devices. A closed-loop controller of the control voltage generation block 281 typically has the output DC bus voltages (Vout+ and Vout−), the received AC current $i_{ac}$, and the received AC voltage $V_{ac}$ at the AC source 201 as its inputs. The control signal $V_{ctrl}$ 291 will make the waveform generating block 285 generate a PWM-like voltage that has a fundamental component very close to the received AC voltage, with some small difference in amplitude and phase to make the power flow from the input node to the output nodes of the AC to DC converter circuit.

FIG. 3E shows an embodiment for a set of control waveforms supplied to the switches Q1 231, Q2 232, Q3, 245, and Q4 248 by control circuitry, represented schematically as the switching control waveform generating block 285 in FIG. 3D. ($V_{Q5}$ and $V_{Q6}$ will be introduced below with respect to the discussion of FIGS. 4 and 5.) The control signal $V_{ctrl}$ 291 and the input AC current $i_{ac}$ 293 are shown at top, with corresponding gate voltages over one cycle shown below. In FIG. 3E, note that the control signal $V_{ctrl}$ 291 and the input AC current $i_{ac}$ 293 are shown as being in phase, whereas the voltage $V_{ac}$ and the current $i_{ac}$ is the original current waveform as received from AC source 201 may be out of phase. In a power factor correction circuit, the control signal $V_{ctrl}$ 291 is typically the output of a closed-loop controller.

When $V_{ctrl}$ 291 is in the positive half cycle (shown to the left of the vertical broken line), the switch Q1 231 is on (i.e., closed) so that the voltage level on the input node A will set the voltage level on the upper intermediate node P+. The switch Q4 248 is off (i.e., open), so that the hybrid device H2 is effectively just the diode D2 247 and the lower intermediate node P− will be at the intermediate level. The switches Q2 232 and Q3 245 have a set of non-overlapping waveforms that generate the PWM waveform on the input node A and on the upper intermediate node P+.

When $V_{ctrl}$ 291 is in the negative half cycle (shown to the right of the vertical broken line), the switch Q2 232 is on (i.e., closed) and Q3 245 is off (i.e., open), so that the level on input node A will also set the level on lower intermediate node P−, while upper intermediate node P+ is at the intermediate level. The switch Q1 231 and the switch Q4 248 have a set of non-overlapping waveforms that generate the PWM waveform on the input node A and on the lower intermediate node P−.

$V_A$ is the voltage level on the input node A and shows the resultant multi-level behavior. In the positive half cycle when Q1 231 is on, both of $V_{P+}$ and $V_A$ are high when Q2 232 is off and at the intermediate voltage level of the mid-level node when Q2 232 is on, resulting in the shown pulse-width modulation (PWM) waveforms. In the negative half cycle, $V_{P+}$ is at the intermediate voltage level of the mid-level node, while $V_A$ is at the intermediate voltage level when Q1 231 is on or negative when Q1 231 is off. Similarly, $V_{P−}$ will be at the intermediated voltage level of node M in the positive half cycle and the same as $V_A$ in the negative half cycle.

Figure 2:
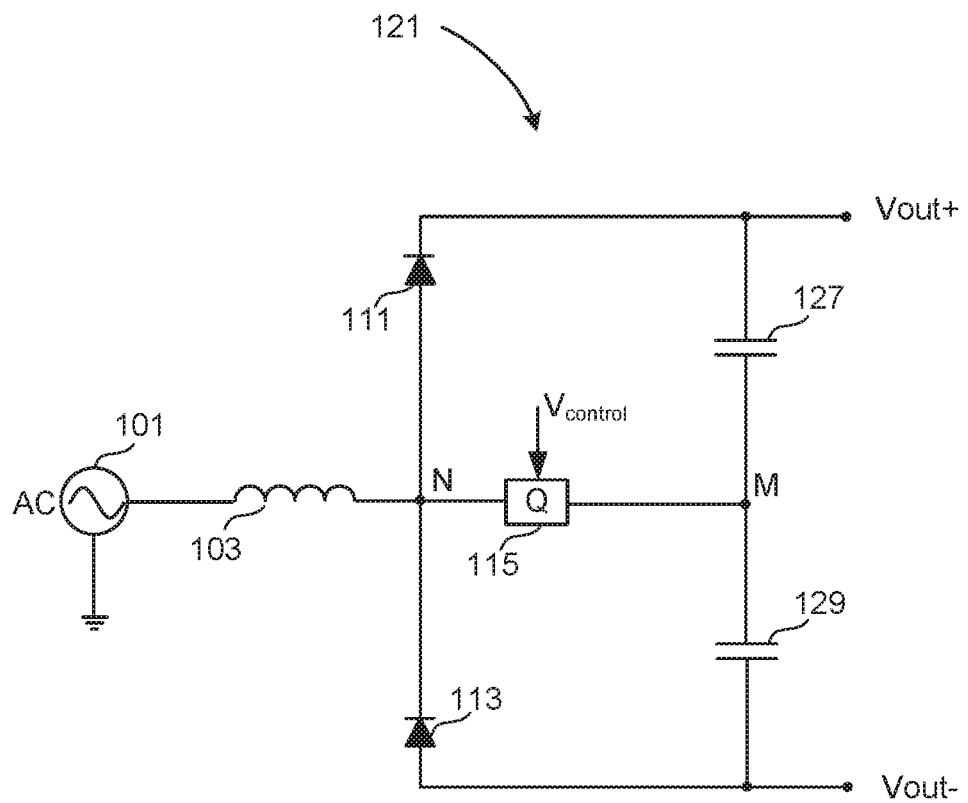
FIG. 2 shows an example of a prior art power factor correction circuit that can be included in the power factor correction circuit system introduced in FIG. 1.

The arrangement FIGS. 3A-D has a number of advantages over the sort of arrangement illustrated with respect to FIG. 2. Rather than needing to support the full DC bus voltage, all of the devices of FIGS. 3A-3C can have a voltage rating that is 50% of the DC bus voltage. The use of lower voltage rating devices provides better efficiency. By introduction of the parallel current paths of the hybrid devices H1 241 and H2 242 to the respective output nodes Vout+ and Vout−, D1 243 and D2 247 can be implemented as super-fast diodes, with lower current rating and lower cost (relative to the diodes 111 and 113 in the prior art embodiment in FIG. 2).

Referring again to FIG. 3B, components D1 243, Q3 245 and D3 245 form a hybrid device H1 241 that has a first current path through D1 243, which is faster switching and with a lower current rating, in parallel with a second current path through Q3 245 and D3 245, which can support more current but with a slower switching rate. In the slower, high current path of Q3 245 and D3 245, D3 245 can be a slow diode with a low forward voltage and Q3 245 can be a MOSFET with a very low voltage rating, for example 30V. In the second path from node P+ to Vout+, D1 243 can be a super-fast diode with a low current rating. During a switching mode, when Q1 231 has turned off but Q3 245 has not yet turned on, as Q3 245 is off current will not flow through D3 245, and the faster D1 243 takes the switching. After switching when Q3 245 has turned on, the path through the pair Q3 245 and D3 245 takes the primary conduction current. In one set of embodiments, there can be 1.5 µs or more of dead time between when either of Q3 245 or Q2 232 are on, during which minority carriers of D3 245 can be fully recombined, leading to negligible reverse recovery in D3 245.

The lower hybrid device H2 242 shown in FIG. 3C operates similarly to the H1 241, but is connected between the Vout− node and the lower intermediate node P−. In H2 242, the faster, lower current path is now through D2 247. The series connected pair Q4 248, and D4 249 provide the slower switching, but higher current path from the Vout− node to the lower intermediate node P−.

The mid-level node M is connected to the upper intermediate node P+ and the lower intermediate node P− through D5 255 and D6 256. D5 255 and D6 256 can be very slow diodes, but with a low forward voltage drop.

Figure 4:
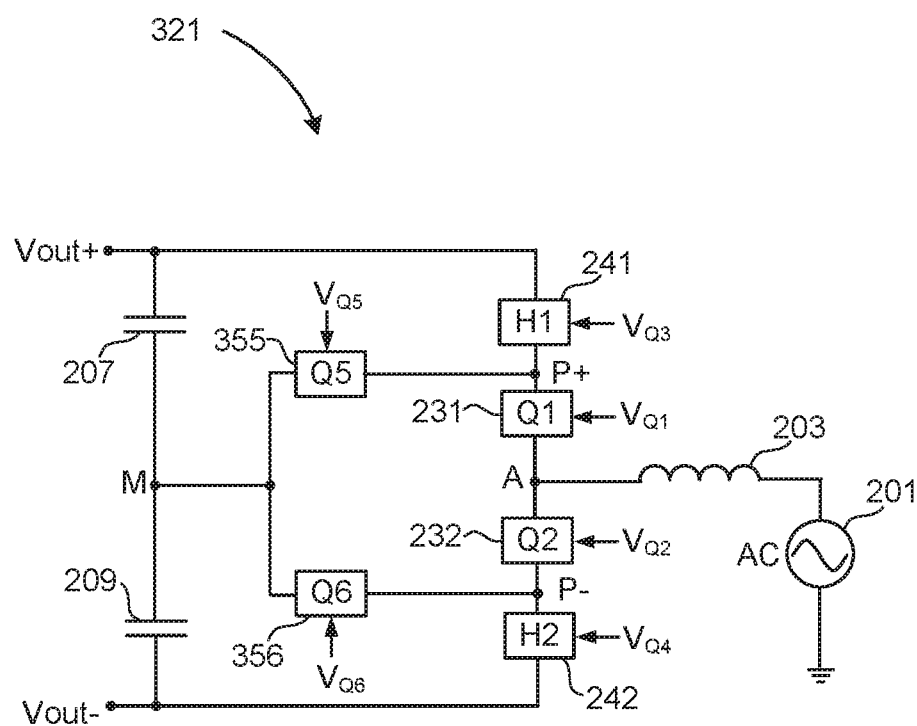
FIGS. 4 and 5 show alternate embodiments of a multi-level power factor correction circuit using hybrid devices.

FIG. 4 illustrates an alternate embodiment of a multi-level hybrid PFC circuit 321. The elements of FIG. 4 are labelled as in FIG. 3A, but the diodes D5 255 and D6 256 are now replaced by switches Q5 355 and Q6 356, respectively, which can be implemented as MOSFETs in a first set of embodiments. The control voltages $V_{Q5}$ and $V_{Q6}$ for Q5 355 and Q6 356 would be generated by the switching control waveform generating block 285 along with $V_{Q1}$, $V_{Q2}$, $V_{Q3}$, and $V_{Q4}$. Examples of the control voltages $V_{Q5}$ and $V_{Q6}$ are illustrated in FIG. 3E, where Q5 355 is on during the negative voltage half cycle and Q6 356 is on during the positive voltage half cycle. The use of the actively controlled MOSFET switches can provide for lower conduction loss, relative to the diodes of FIG. 3A. Additionally, the diodes D5 255 and D6 256 for FIG. 3A can leave the upper intermediate node P+ and its lower-half counterpart P− floating, whereas the switches Q5 355 and Q6 356 provide the ability for these intermediate nodes P+ and P− to be clamped to the intermediate voltage level of the mid-level node M. The other devices in this embodiment can then be clamped with a lower voltage stress.

Figure 5:
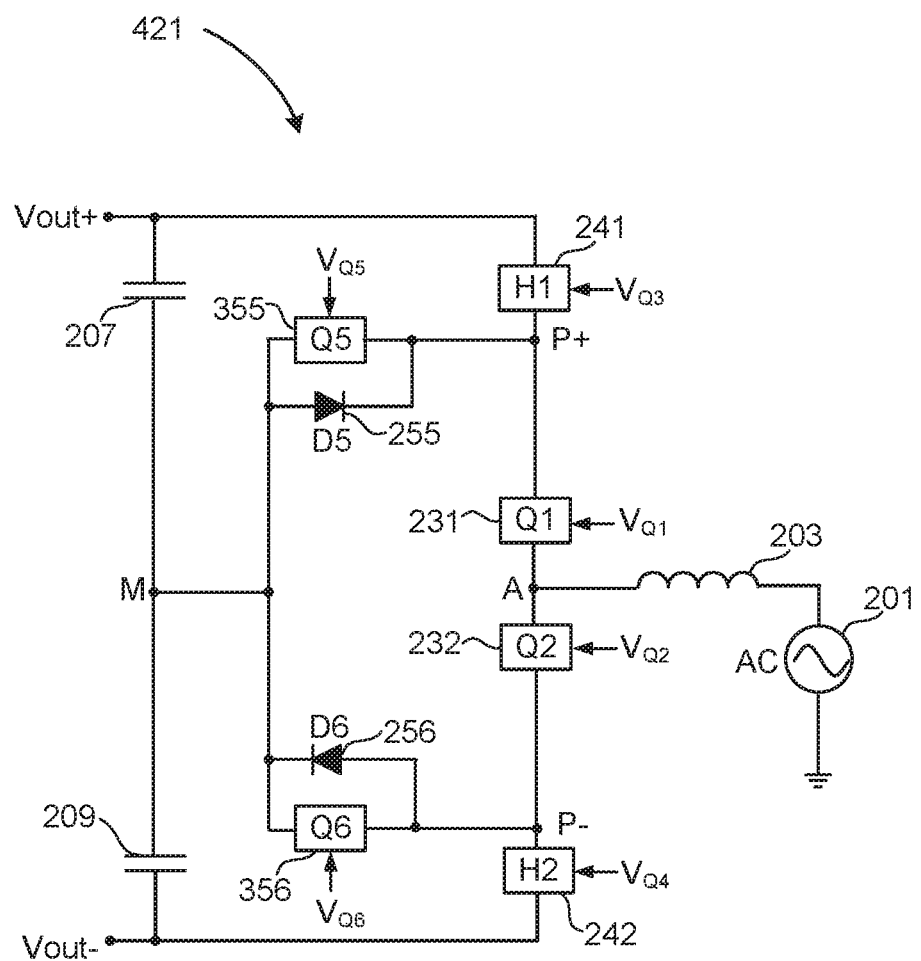

The embodiment for a PFC circuit 421 of FIG. 5 presents another variation on the circuit of FIGS. 3A and 4, where the diodes D5 255 and D6 256 are each respectively connected in parallel with the switches Q5 355 and Q6 356 to provide better performance. The switches Q5 355 and Q6 356 can be implemented as MOSFETs. Lower conduction losses can be obtained through this arrangement, as the MOSFETs of Q5 355 and Q6 356 can be lower current devices that use a small die size, which can provide lower costs, while the diodes D5 255 and D6 256 provide a path for additional current. As with FIG. 4, the switches Q5 355 and Q6 356 provide voltage clamping capability so that all other devices can be clamped with lower voltage stress.

Figure 6:
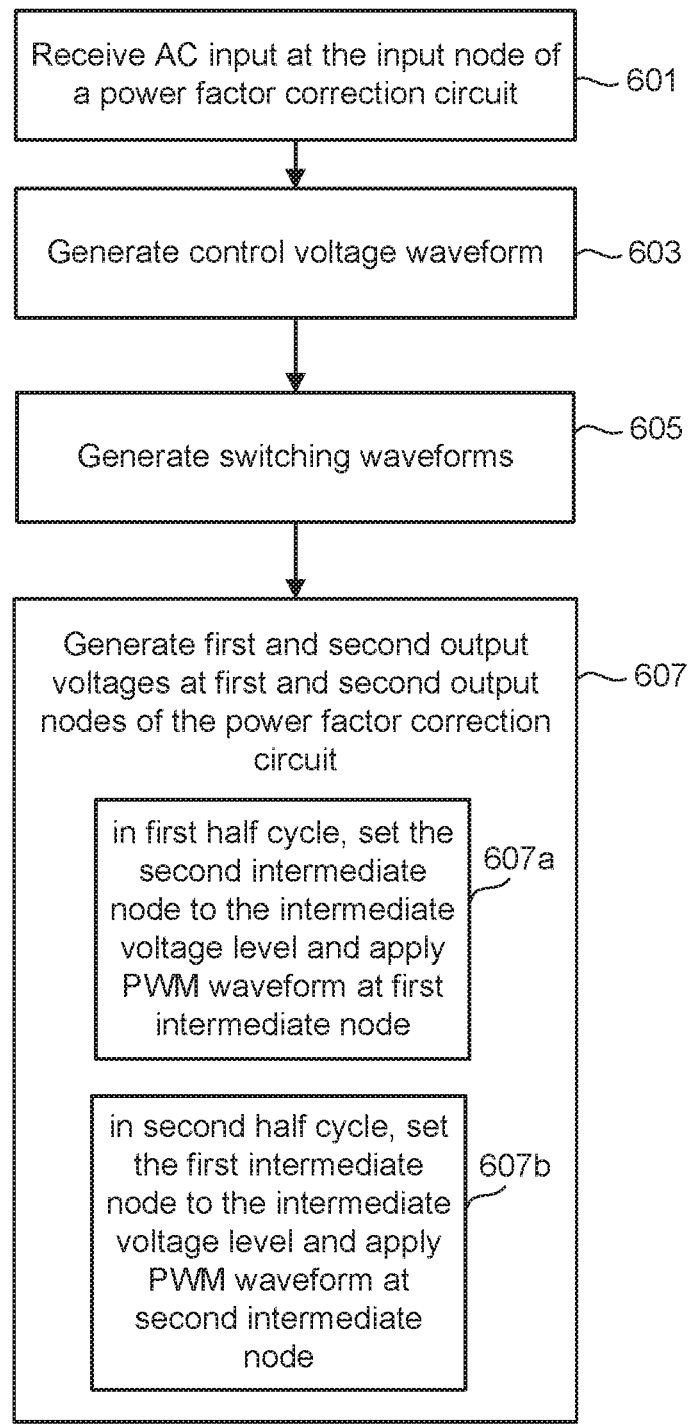
FIG. 6 is a flow diagram illustrating aspects of the operation of the embodiments of FIGS. 3A-3E, 4 and 5.

FIG. 6 is a flow chart illustrating the operation of the various AC to DC converters of embodiments of FIGS. 3A-3D, 4 and 5. More generally, FIG. 6 is used to summarize methods according to various embodiments of the present technology. A PFC circuit receives an AC voltage $V_{ac}$, for example from AC source 201, at its input node at 601. At 603, a control waveform $V_{ctrl}$ is generated from the received AC voltage. As discussed above, a PFC circuit will typically generate $V_{ctrl}$ based on the current $i_{ac}$ and received AC voltage $V_{ac}$, and based on the output voltages (Vout+ and Vout−) produced at 607. At 605, switching waveforms for the AC to DC converter circuit are generated from $V_{ctrl}$. First and second output voltages (Vout+ and Vout−) are generated at their corresponding output nodes at 607.

In a first half cycle (the positive half cycle of the control signal $V_{ctrl}$) at 607a, the upper intermediate node P+ has a PWM waveform applied, as shown in the $V_{P+}$ waveform of FIG. 3E, and the lower intermediate node P− is at the intermediate voltage level. As described above in the context of the embodiments of FIGS. 3A-3E, the generation of the output voltages involves setting Q1 231 on and Q4 248 off, while applying non-overlapping waveforms to Q2 232 and Q3 245 in a first half cycle.

In a second half cycle (the negative half cycle of the control signal WO at 607b, the upper intermediate node P+ is instead at the intermediate voltage level and the lower intermediate node P− has a PWM waveform applied, corresponding to setting Q2 232 on and Q3 245 off, while applying non-overlapping waveforms to Q1 231 and Q4 248.

In the disclosed embodiments, the use of a hybrid combination of switching devices, instead of a single diode at the top (D1 243) and bottom (D2 247) for a three-level rectifier, can reduce overall power loss and cost. The keeping of Q1 231 and Q2 232 on for half of the $V_{ctrl}$ cycle further helps to reduce conduction loss that would be incurred if these devices were kept off and only their reverse diodes conducted the current.

For the embodiments of FIGS. 4 and 5, adding switches Q5 355 and Q6 356 for voltage clamping can further improve operation. As with the other switches, Q5 355 and Q6 356 can be implemented as MOSFETs. By replacing D5 255 and D6 256 with the switches Q5 355 and Q6 356 as in FIG. 4, conduction loss is lowered. Adding the switches Q5 355 and Q6 356 in parallel with diodes D5 255 and D6 256, as in FIG. 5, can provide additional cost reductions as the die size of the MOSFETs used for switches Q5 355 and Q6 356 can be reduced.

More generally, referring to FIGS. 3A-3E, 4 and 5, various embodiments of AC to DC conversion circuits can be implemented by an intermediate circuitry module connected to the input node (node A) and the intermediate voltage node of a voltage divider (capacitors 207, 209) connected between the output voltage nodes voltages (Vout+ and Vout−). The intermediate circuitry module provides the PWM waveforms to the hybrid devices at the lower and upper intermediate nodes.

Specific examples of the intermediate circuitry are shown in FIGS. 3A-3E, 4 and 5. For example, Q1 231, Q2 232, D5 255 and D6 256 in FIG. 3A. However other embodiments can use different combinations of diodes, switches, and other circuit elements to generate the multi-state waveform at the input node A, and PWM waveforms at the lower and upper intermediate nodes.

With respect to the hybrid device modules, these include parallel current paths between the intermediate nodes and their respective output nodes, where one of the paths is a faster switching, lower current rated path than the other. For example, the embodiments of FIGS. 3A-3E, 4 and 5 use a diode (D1 243 or D2 247) for the fast switching, low current path and a series connected switch-diode pair (Q3 245 and D3 245, or Q4 248 and D4 249) for the slower, higher current path. Alternative embodiments can use other combinations of switches, diodes and other circuit elements for these parallel paths.

As noted above, the examples described herein show only a single AC voltage supplying the single node A for simplicity of discussion. However, multiple ones of these individual branches can be combined to have multi-phase inputs which in turn split to multiple branches.

Figure 1:
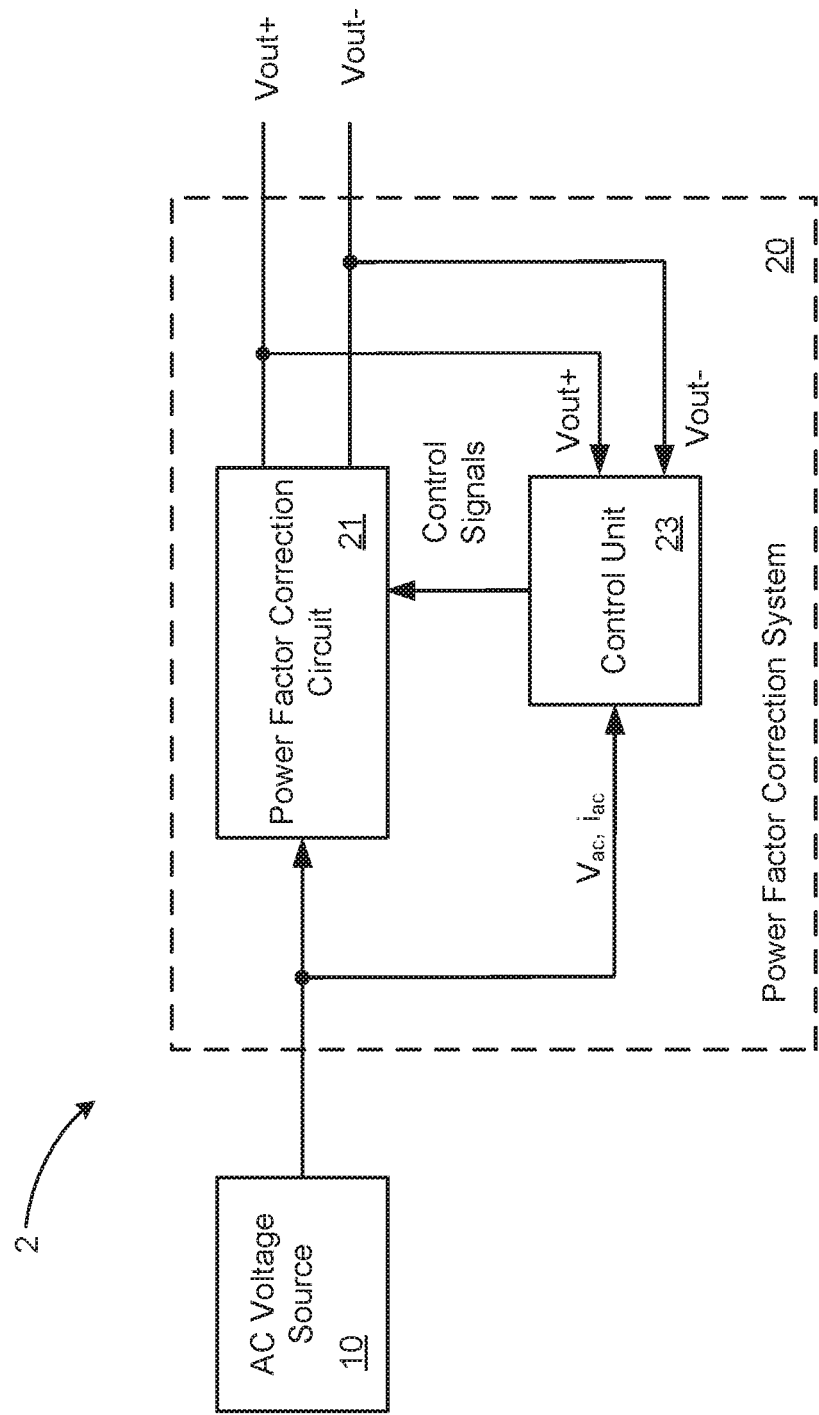
FIG. 1 illustrates a prior art power factor correction circuit system.

The power factor corrections circuits described herein can be used as part of power factor correction system, such as illustrated in FIG. 1, in an AC to DC conversion process. In FIG. 3D, the switching control waveform generating block 285 and the control voltage generation block 281 are part of the control unit module 23 of FIG. 1. More generally, such a control unit module will use voltage $V_{ac}$ and current $i_{ac}$ of the input AC voltage source and one or more of the output voltage levels to determine the control signals for power factor correction circuit 21.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An alternating current (AC) to direct current (DC) converter, comprising:
   a first switch connected between an input node and a first intermediate node;
   a second switch connected between the input node a second intermediate node;

a first circuit element configured to provide a current path from a mid-level node to the first intermediate node;
a second circuit element configured to provide a current path from the second intermediate node to the mid-level node; and
a first hybrid device configured to provide first and second current paths in parallel from the first intermediate node to a first output node, wherein the first current path is a faster switching, lower current rated path than the second current path; and
a second hybrid device configured to provide third and fourth current paths in parallel from a second output node to the second intermediate node, wherein the third current path is a faster switching, lower current rated path than the fourth current path,
the first switch, second switch, first hybrid device, and second hybrid device collectively configured to generate a multi-level waveform at the input node in response to a set of control signals,
wherein the AC to DC converter is configured to provide a DC output between the first output node and the second output node, and
wherein:
the first hybrid device comprises:
first and second diodes connected along parallel current paths from the first intermediate node to the first output node, wherein the first diode is a faster switching, lower current rated device than the second diode; and
a third switch connected in series with the second diode between the first intermediate node and the first output node; and
the second hybrid device comprises:
third and fourth diodes connected along parallel current paths from the second intermediate node to the second output node, wherein the third diode is a faster switching, lower current rated device than the fourth diode; and
a fourth switch connected in series with the fourth diode between the second intermediate node and the second output node.

2. The AC to DC converter of claim 1, wherein the first circuit element includes a third diode connected along a current path from the mid-level node to the first intermediate node, and the second circuit element includes a fourth diode connected along a current path from the second intermediate node to the mid-level node.

3. The AC to DC converter of claim 1, wherein the first circuit element includes a fifth switch connected between the mid-level node and the first intermediate node, and the second circuit element includes a sixth switch connected between the second intermediate node and the mid-level node.

4. The AC to DC converter of claim 3, wherein the first circuit element further includes a third diode connected in parallel with the fifth switch between the mid-level node and the first intermediate node, and the second circuit element further includes a fourth diode connected in parallel with the sixth switch between the second intermediate node and the mid-level node.

5. The AC to DC converter of claim 1, further comprising:
a voltage divider comprising:
a first capacitor connected between the first output node and the mid-level node; and
a second capacitor connected between the second output node and the mid-level node.

6. The AC to DC converter of claim 1, further comprising control circuitry connected to the first switch, the second switch, the third switch and the fourth switch, wherein the control circuitry is configured to generate the set of control signals such that:
in a first half cycle, the first switch is on, the fourth switch is off, and the second switch and the third switch are turned on according to non-overlapping waveforms; and
in a second half cycle, the second switch is on, the third switch is off, and the first switch and the fourth switch are turned on according to non-overlapping waveforms.

7. The AC to DC converter of claim 6, wherein the control circuitry is connected to receive an AC waveform and generate therefrom a control voltage waveform, wherein the first half cycle corresponds to a positive voltage half cycle of the control voltage waveform and the second half cycle corresponds to a negative voltage half cycle of the control voltage waveform.

8. The AC to DC converter of claim 6, wherein:
the first circuit element includes a fifth switch connected between the mid-level node and the first intermediate node;
the second circuit element includes a sixth switch connected between the second intermediate node and the mid-level node;
the control circuitry is further connected to the fifth switch and the sixth switch; and
the control circuitry is further configured such that in the first half cycle the fifth switch is off and the sixth switch is on, and such that in the second half cycle the sixth switch is off and the fifth switch is on.

9. An alternating current (AC) to direct current (DC) conversion system, comprising:
an input node configured to accept an AC signal;
a power factor correction circuit, comprising:
a first switch connected between the input node and a first intermediate node;
a second switch connected between the input node and a second intermediate node;
a first circuit element configured to allow current to flow from a mid-level node to the second intermediate node;
a second circuit element configured to allow current to flow from the second intermediate node to the mid-level node;
a first hybrid device, comprising first and second current paths in parallel from the first intermediate node to a first output node, wherein the first current path is a faster switching, lower current rated path than the second current path; and
a second hybrid device, comprising third and fourth current paths in parallel from a second output node to the second intermediate node, wherein the third current path is a faster switching, lower current rated path than the fourth current path, wherein the power factor correction circuit is configured to provide a DC output between the first output node and the second output node; and
a control circuit connected to the input node and to the first and second output nodes, the control circuit configured to generate switching signals for the first and second switches and for the first and second hybrid devices based upon a voltage and a current at the input node and voltage levels on the first and second output nodes,
wherein the first hybrid device comprises:

first and second diodes connected along parallel current paths from the first intermediate node to the first output node, wherein the first diode is a faster switching, lower current rated device than the second diode; and a third switch connected in series with the second diode between the first intermediate node and the first output node; and the second hybrid device comprises:

third and fourth diodes connected along parallel current paths from the second intermediate node to the second output node, wherein the third diode is a faster switching, lower current rated device than the fourth diode; and a fourth switch connected in series with the fourth diode between the second intermediate node and the second output node.

10. The AC to DC conversion system of claim 9, wherein:

the control circuit is connected to the first, second, third and fourth switches;

the control circuit is configured such that in a first half cycle, the first switch is on, the fourth switch is off, and the second switch and the third switch are turned on according to non-overlapping waveforms; and in a second half cycle, the second switch is on, the third switch is off, and the first switch and the fourth switch are turned on according to non-overlapping waveforms.

11. A method, comprising:

receiving an alternating current input voltage at an input node of an alternating current (AC) to direct current (DC) converter; and respectively generating first and second output voltages at first and second output nodes of the AC to DC converter from the alternating current input voltage, the AC to DC converter comprising:

a first hybrid device, comprising first and second current paths in parallel from a first intermediate node to a first output node, wherein the first current path is a faster switching, lower current rated path than the second current path; and a second hybrid device, comprising third and fourth current paths in parallel from a second output node to a second intermediate node, wherein the third current path is a faster switching, lower current rated path than the fourth current path, wherein generating the first and second output voltages includes:

when in a first half cycle, setting the second intermediate node to a voltage level between the first output voltage and the second output voltage and applying a pulse width modulated waveform at the first intermediate node; and when in a second half cycle, setting the first intermediate node to the voltage level between the first output voltage and the second output voltage and applying a pulse width modulated waveform at the second intermediate node, wherein:

the first hybrid device comprises: first and second diodes connected along parallel current paths from the first intermediate node to the first output node, wherein the first diode is a faster switching, lower current rated device than the second diode; and a third switch connected in series with the second diode between the first intermediate node and the first output node; and the second hybrid device comprises: third and fourth diodes connected along parallel current paths from the second intermediate node to the second output node, wherein the third diode is a faster switching, lower current rated device than the fourth diode; and a fourth switch connected in series with the fourth diode between the second intermediate node and the second output node, and wherein:

generating the first output voltage comprises selectively turning on the third switch; and generating the second output voltage comprises selectively turning on the fourth switch.

12. The method of claim 11, wherein the AC to DC converter further comprises: a first switch connected between the input node and the first intermediate node; a second switch connected between the input node and the second intermediate node; a first circuit element configured to allow current to flow from a mid-level node to the first intermediate node, where the mid-level node has the voltage level between the first output voltage and the second output voltage; and a second circuit element configured to allow current to flow from the second intermediate node to the mid-level node, wherein the method includes:

in the first half cycle: setting the first switch on, the fourth switch off, and turning the second and third switches on according to non-overlapping waveforms; and in the second half cycle: setting the second switch on, the third switch off, and turning the first and fourth switches on according to non-overlapping waveforms.

13. The method of claim 12, further comprising:

generating a control voltage waveform from the alternating current input voltage, wherein the first half cycle corresponds to a positive voltage half cycle of the control voltage waveform and the second half cycle corresponds to a negative voltage half cycle of the control voltage waveform.

14. The method of claim 13, wherein the control voltage waveform is further generated based on the first and second output voltages.

15. The method of claim 12, wherein the first circuit element is a fifth diode connected along a current path from the mid-level node to the first intermediate node, and the second circuit element is a sixth diode connected along a current path from the second intermediate node to the mid-level node.

16. The method of claim 12, wherein the first circuit element includes a fifth switch connected between the mid-level node and the first intermediate node, and the second circuit element includes a sixth switch connected between the second intermediate node and the mid-level node and generating the first and second output voltage further includes:

in the first half cycle turning off the fifth switch and turning on the sixth switch is on, and in the second half cycle turning off the sixth switch and turning on the fifth switch.

17. The method of claim 16, wherein the first circuit element further includes a fifth diode connected in parallel with the fifth switch between the mid-level node and the first intermediate node, and the second circuit element further includes a sixth diode connected in parallel with the sixth switch between the second intermediate node and the mid-level node.

18. The AC to DC conversion system of claim 9, wherein the first circuit element includes a third diode connected along a current path from the mid-level node to the first intermediate node, and the second circuit element includes a fourth diode connected along a current path from the second intermediate node to the mid-level node.

19. The AC to DC conversion system of claim 9, wherein the first circuit element includes a fifth switch connected between the mid-level node and the first intermediate node, and the second circuit element includes a sixth switch connected between the second intermediate node and the mid-level node.

20. The AC to DC conversion system of claim 19, wherein the first circuit element further includes a third diode connected in parallel with the fifth switch between the mid-level node and the first intermediate node, and the second circuit element further includes a fourth diode connected in parallel with the sixth switch between the second intermediate node and the mid-level node.

* * * * *

UNITED STATES PATENT AND TRADEMARK OFFICE
CERTIFICATE OF CORRECTION

PATENT NO. : 10,361,626 B2
APPLICATION NO. : 16/007325
DATED : July 23, 2019
INVENTOR(S) : Fu et al.

Page 1 of 1

It is certified that error appears in the above-identified patent and that said Letters Patent is hereby corrected as shown below:

On the Title Page

Item (71), Applicant: After "Futurewei Technologies, Inc." insert -- Plano, TX (US) --

Signed and Sealed this
Third Day of September, 2019

Andrei Iancu
*Director of the United States Patent and Trademark Office*